United States Patent
Haag et al.

(10) Patent No.: US 7,791,527 B2
(45) Date of Patent: Sep. 7, 2010

(54) METHOD AND DEVICE FOR OBJECT DETECTION IN THE CASE OF A VEHICLE

(75) Inventors: Peter Haag, Billigheim (DE); Ruediger Jordan, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 221 days.

(21) Appl. No.: 11/658,982

(22) PCT Filed: Jun. 1, 2005

(86) PCT No.: PCT/EP2005/052503
§ 371 (c)(1),
(2), (4) Date: Nov. 14, 2008

(87) PCT Pub. No.: WO2006/010662
PCT Pub. Date: Feb. 2, 2006

(65) Prior Publication Data
US 2009/0079986 A1    Mar. 26, 2009

(30) Foreign Application Priority Data
Jul. 28, 2004  (DE) .................. 10 2004 036 580

(51) Int. Cl.
*G01S 13/93* (2006.01)
(52) U.S. Cl. .................. 342/70; 342/148; 340/435; 340/436; 340/903; 701/301
(58) Field of Classification Search ............ 342/70–72, 342/27, 147, 148; 340/435–436, 903; 701/301
See application file for complete search history.

(56) References Cited

U.S. PATENT DOCUMENTS

| | | | |
|---|---|---|---|
| 3,831,174 A | 8/1974 | King et al. | |
| 4,005,421 A | 1/1977 | Dax et al. | |
| 4,472,718 A | 9/1984 | Ohashi et al. | |
| 4,595,925 A | 6/1986 | Hansen et al. | |
| 4,916,450 A * | 4/1990 | Davis | 342/71 |
| 5,635,844 A * | 6/1997 | Takigawa et al. | 324/642 |
| 5,793,325 A * | 8/1998 | Yamada | 342/70 |
| 6,243,037 B1 | 6/2001 | Pulford et al. | |
| 6,429,804 B1 * | 8/2002 | Kishida et al. | 342/70 |
| 6,583,752 B2 * | 6/2003 | Samukawa et al. | 342/70 |
| 6,862,527 B2 * | 3/2005 | Okamura et al. | 701/301 |
| 7,636,625 B2 * | 12/2009 | Weber et al. | 701/45 |
| 2001/0052844 A1 * | 12/2001 | Shirai et al. | 340/435 |
| 2002/0005778 A1 * | 1/2002 | Breed et al. | 340/435 |

(Continued)

FOREIGN PATENT DOCUMENTS

JP    63311513 A  * 12/1988

(Continued)

*Primary Examiner*—John B Sotomayor
(74) *Attorney, Agent, or Firm*—Kenyon & Kenyon LLP

(57) ABSTRACT

A method and device for object detection in the case of a vehicle equipped with an object-detection system, the object-detection system emitting electromagnetic radiation and receiving radiation reflected off objects within the detection range, and the radiation reflected off a detected object, which was additionally reflected off an object extending along the roadway, is analyzed. The analysis consists of a plausibilization in which the directly measured object reflections are verified using the indirect object reflections, or in that the analysis consists of utilizing the indirect object reflections for the further object detection if reflections from a previously detected object are no longer measurable.

16 Claims, 3 Drawing Sheets

U.S. PATENT DOCUMENTS

| | | | |
|---|---|---|---|
| 2004/0080449 A1* | 4/2004 | Horibe | 342/70 |
| 2005/0285773 A1* | 12/2005 | Hartzstein et al. | 342/70 |
| 2006/0077052 A1* | 4/2006 | Matsuoka | 340/471 |
| 2006/0085131 A1* | 4/2006 | Yopp et al. | 701/301 |
| 2009/0079986 A1* | 3/2009 | Haag et al. | 356/445 |

FOREIGN PATENT DOCUMENTS

| | | |
|---|---|---|
| JP | 2001116839 | 4/2001 |
| JP | 2004226121 | 8/2004 |
| WO | 99 27384 | 6/1999 |
| WO | 99 36796 | 7/1999 |
| WO | WO 2004067308 A1 * | 8/2004 |

* cited by examiner

METHOD AND DEVICE FOR OBJECT DETECTION IN THE CASE OF A VEHICLE

RELATED APPLICATION INFORMATION

The present application is a U.S. national phase patent application of PCT/EP2005/052503, which was filed on Jun. 1, 2005, and which claims priority to and the benefit of German patent application no. 10 2004 036 580.6, which was filed in Germany on Jul. 28, 2004, the disclosures of which are incorporated herein by reference.

FIELD OF THE INVENTION

The present invention relates to a method and a device for object detection in the case of a vehicle equipped with an object-detection system, the object-detection system emitting electromagnetic radiation and receiving radiation reflected off objects within the detection range, the radiation reflected off a detected object, which was additionally reflected off an object extending along the roadway, being analyzed. The analysis consists of a plausibilization in which the directly measured object reflections are verified using the indirect object reflections, or, if reflections from a previously detected object are no longer able to be measured, the analysis consists of using the indirect object reflection for the further object detection.

BACKGROUND INFORMATION

From the publication "Adaptive cruise control ACC" published by Robert Bosch GmbH, Stuttgart, in April 2002 (ISBN-3-7782-2034-9), an adaptive distance and speed control system is known which detects vehicles driving ahead with the aid of emitted microwave radiation and intervenes in the drive and brake devices of the vehicle in such a way that a speed control in the sense of a distance control is implemented if a vehicle driving ahead is detected, and a speed control in the sense of a constant speed control is implemented if no vehicle driving ahead is present. To this end, microwave radiation, which is FMCW-modulated, is emitted and partial waves of the emitted radiation reflected off the objects in the sensor detection range are received again and analyzed by the distance sensor.

SUMMARY OF THE INVENTION

The essence of the present invention is to provide a method and a device by which the object detection in the case of a vehicle having an object-detection system and an adaptive distance and speed control system is improved in that object reflections that are additionally reflected off an object extending along the roadway, such as a guard rail, are used for object verification or, if no direct object reflection is present, i.e., a microwave reflection off the vehicle driving ahead, without guard rail reflection, the indirect reflection, i.e., the microwave reflection off the vehicle driving ahead, is replaced by additional reflection off the guard rail, and the indirect object reflection is utilized for further object tracking.

Since guard rails make good radar reflectors, when using a radar sensor for vehicle steering, it is possible that reflections off guard rails occur in which reflections of the radar radiation of the object sensor at real objects are additionally reflected off the guard rail, so that a phantom object is created which moves outside the road, for instance. It is difficult to distinguish this phantom object from the real object, since in the case of objects that have approximately the same distance and the same relative speed, an object separation by means of the received azimuth angle is impossible even if the radar sensor is normally able to resolve the azimuth angle. The reason for this is that the reflection components of the reflection and the real object superpose; the stronger component dominates and the reflection may have a considerably greater signal strength than the direct reflection off the real object since the cross section of the radar backscatter is heavily dependent on the viewing angle of the object, and consequently only the azimuth angle of the object that has the higher signal strength is measured. Therefore, it is the essence of the present invention to avoid misses in the object tracking as well as phantom targets due to guard rail reflections.

It is advantageous that the analysis is a plausibilization in which the directly measured object reflections that were not reflected off an object extending along the roadway are verified by the indirect object reflections that were additionally reflected off an object extending along the roadway.

Moreover, if further reflections from a previously directly detected object are no longer measurable, it is also advantageous that the analysis consists of utilizing for the further object detection the indirect object reflection reflected off an object extending along the roadway.

Furthermore, it is advantageous that the objects extending along the roadway are guard rails, tunnel walls, sound-abatement barriers, boundary walls or guide posts set up at regular intervals.

Moreover, it is advantageous that the indirect object reflection is converted into an assumed direct object reflection for analysis.

It is especially advantageous that the position of the object extending along the roadway is estimated for the purpose of converting the indirect object reflection into an assumed direct object reflection.

Furthermore, it is advantageous that the conversion is implemented in such a way that the measured object location detected by the indirect measurement is reflected off the object extending along the roadway.

Of special importance is the implementation of the method of the present invention in the form of a control element provided for a control unit of an adaptive distance and speed control of a motor vehicle. In this context, a program that is executable on a computing element, particularly on a microprocessor or signal processor, and which is suitable for implementing the method according to the present invention, is stored in the control element. In this case, the present invention is therefore carried out by a program stored in the control element, so that this control element equipped with the program constitutes the present invention in the same manner as the method for whose execution the program is suited. In particular, an electrical storage medium, for example a read-only memory, may be used as control element.

DETAILED DESCRIPTION

Figure 1:
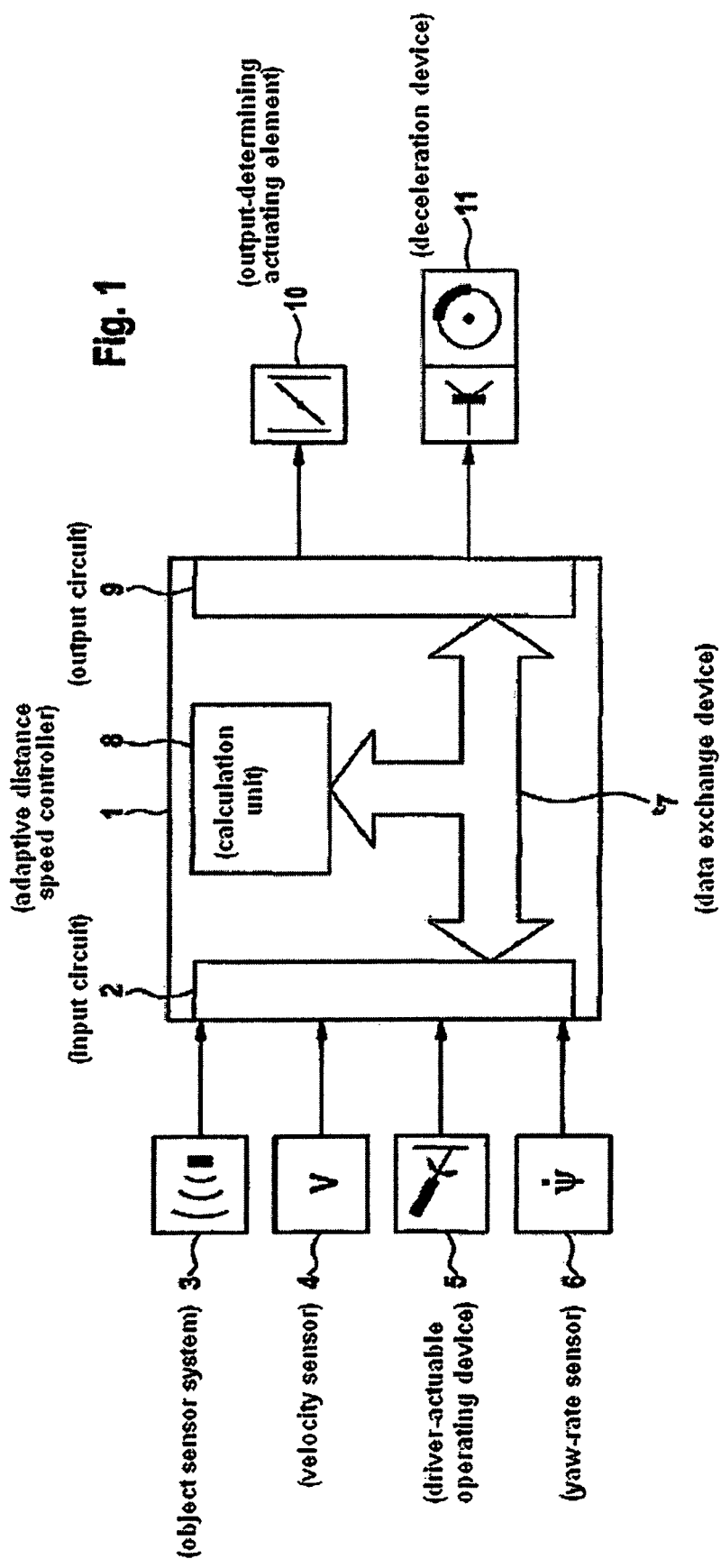
FIG. 1 shows a schematic block diagram of an exemplary embodiment of the device according to the present invention.

FIG. 1 shows a schematic block diagram of an exemplary embodiment of the device according to the present invention. Shown is an adaptive distance and speed controller 1, which has an input circuit 2, among others. Using this input circuit 2, distance and speed controller 1 is able to be supplied with input signals. Signals from an object sensor system 3, among others, are supplied to distance and speed controller 1 as input signals. For example, this object sensor system 3 may be embodied as radar sensor, laser sensor, video sensor or as a combination of these types of sensors, and include one or a plurality of individual sensors. It is especially advantageous if object sensor system 3 is configured in such a way that electromagnetic radiation is emitted, reflected off the objects in the sensor-detection range, and the reflected partial waves are received again by object sensor system 3 and analyzed anew. In particular, the analysis determines from the measured values the distance and the relative velocity of the detected objects, and the azimuth angle of the detected objects at which the objects are positioned relative to the extended longitudinal vehicle axis of the own vehicle. Moreover, a velocity sensor 4 supplies input circuit 2 of distance and speed controller 1 with a velocity signal V from a velocity sensor 4, which represents the velocity of the own vehicle. This makes it possible to convert the relative measured values provided by object sensor system 3 into absolute values and thereby distinguish stationary targets from moving targets, for instance. Furthermore, input circuit 2 receives signals from a driver-actuable operating device 5 by which distance and speed controller 1 is able to be switched on and off and adjusted in its control parameters and settings in a driver-specific manner. Moreover, input circuit 2 is supplied with signal $\dot{\psi}$ from a yaw-rate sensor 6, which measures the rotation of the vehicle about the vertical vehicle axis and forwards it to distance and speed controller 1. With the aid of this yaw-rate signal $\dot{\psi}$ it is possible to detect whether the own vehicle is currently driving through a curve or is traveling on a straight roadway. As an alternative, yaw-rate sensor 6 may also be replaced by a steering-angle sensor, so that the currently traversed curve curvature may be inferred from the activation of the steering wheel. Using a data-exchange device 7 within distance and speed controller 1, the input signals supplied to input circuit 2 are forwarded to a calculation unit 8 where actuating signals for downstream actuating elements are calculated as a function of the supplied input data. The relative positions of the detected objects are analyzed in calculation unit 8, and a suitable target object is selected as a function of which the drive device and the delay devices of the vehicle are controlled. In an advantageous manner, this target object is the vehicle that is driving directly ahead of and in the same lane as the own vehicle. The downstream actuating elements are triggered as a function of the velocity and the distance of this vehicle. Actuating signals are determined to this end, which calculation unit 8 transmits to an output circuit 9 with the aid of data-exchange system 7. Output circuit 9 outputs actuating signals to downstream actuating elements, which accelerate or decelerate the vehicle. Provided as actuating element is, for one, an output-determining actuating element 10 of the drive device, which may be an electrically actuable throttle valve or a fuel-metering device of a fuel-injection system, for example.

Furthermore, output circuit 9 outputs actuating signals to deceleration devices 11 of the vehicle, the triggering of deceleration devices 11 generating a brake force or brake pressure. The vehicle brakes convert this brake force or this brake pressure into a vehicle deceleration according to the deceleration-request signal.

Figure 2:
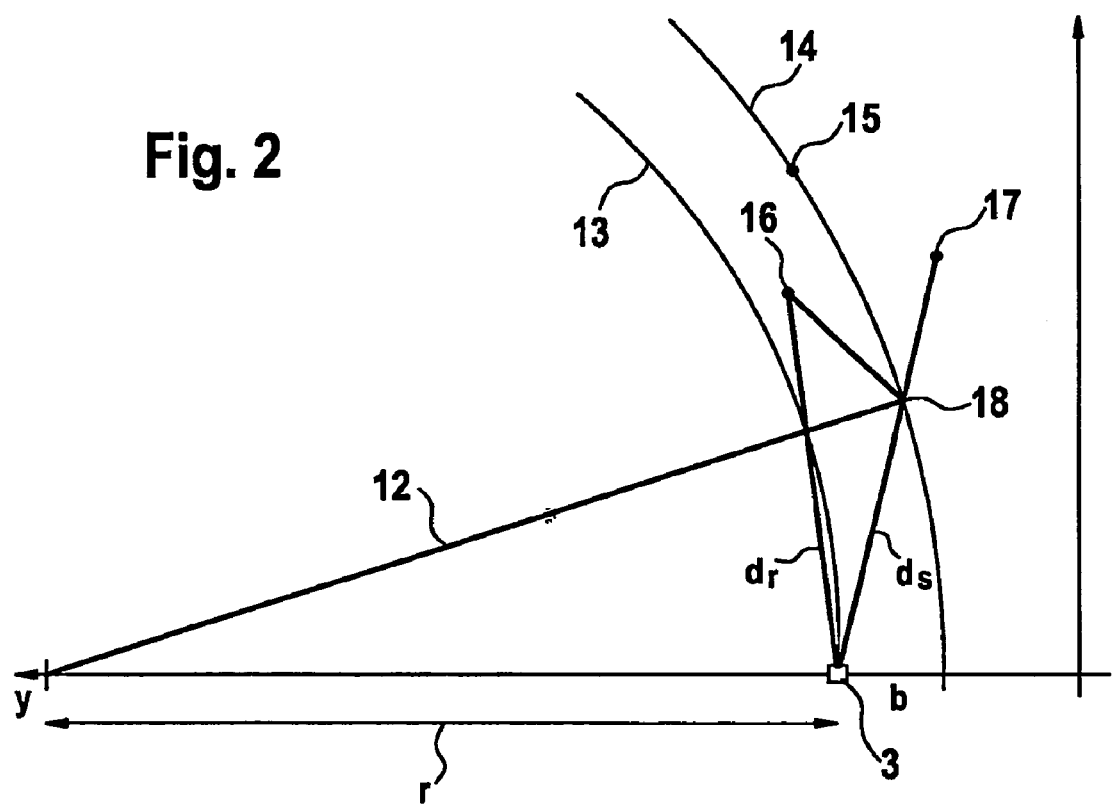
FIG. 2 shows a representation to elucidate the method of the present invention.

FIG. 2 shows a traffic situation in which the method according to the present invention may be used. Visible is object sensor system 3, which advantageously is mounted on the front side of the own vehicle, the own vehicle currently driving through a curve and then continuing its travel along future vehicle course 13. This cornering was determined by analyzing yaw rate $\dot{\psi}$ of yaw-rate sensor 6, for instance, a curve radius r being determined from the yaw rate. Object sensor system 3 has detected objects in the object-detection range such as a stationary object 15 at the side of the roadway, an object 16 on the traffic lane and an object 17 beyond traffic lane 17. Stationary object 15 may be ascertained by comparing own velocity v and analyzing the relative velocity of object 15 $v_{rel}$ and may be, for instance, a sign at the side of the road, a guard rail, a guard post at the side of the road or some other stationary object at the side of the roadway. Moved object 16, which likewise was detected by object sensor system 3, is a vehicle driving ahead, for instance, which travels in the same direction as the own vehicle, at a distance $d_r$ and a relative velocity $v_{rel}$. This object 16 was measured with the aid of a direct object reflection, which means that the microwave radiation emitted by object-sensor system 3 was reflected off object 16 and immediately received again by object-sensor system 3. Moreover, in the situation depicted, there is an object 14 extending along the traffic lane, which is in the form of a guard rail, for instance, a tunnel wall, noise-abatement wall or also guide posts set up along the side of the road at regular intervals. Further reflection of the measured radiation takes place at this object 14 extending along the traffic lane, so that a phantom target 17 is measured. This phantom object 17 is based on an indirect object reflection, in which the measured radiation emitted by object sensor system 3 was reflected off vehicle 16 driving ahead, reflected back in the direction of the object at the side of the traffic lane, and again reflected in point 18 off object 14 extending along the roadway, so that it was received by object sensor system 3 as indirect object reflection. This indirect object reflection is detected by object-sensor system 3 as phantom target 17, which indicates an object position 17 that lies beyond the guard rail, i.e., outside the traffic lane. In quantitative terms, this phantom target 17 moves at the same velocity $v_{rel}$ as object 16, but has distance $d_s$. In order to detect whether a measured object is situated on this side or the other side of object 14 extending along the edge of the roadway, roadway edge 14 is estimated or measured. To this end, stationary targets 15 situated along the road edge such as traffic signs, guard rails or similar reflecting objects are analyzed. If such stationary objects 15 are not detected, it is also possible to estimate roadway edge 14 by assuming a transversal offset b of the roadway edge relative to object sensor system 3, and the roadway edge has a radius of curvature 12 that corresponds to the radius of curvature r+b, r being the radius of curvature of the own vehicle course 13, which was determined with the aid of yaw rate sensor 6, and b being the lateral transversal offset of the object sensor system with respect to the estimated roadway edge. On the basis of this measured or estimated roadway edge it is possible to calculate reflection point 18 at which the direct object reflection of vehicle 16 driving ahead is reflected once more and thereby forms phantom target 17. Since it is recognized that object 17 is on the other side of guard rail 14, it may be assumed that this is a phantom target; with knowledge of reflection point 18 of the measured radiation at guard rail 14 and also of radius of curvature r of the own vehicle course 3 and lateral transverse offset b, and utilizing measured values $d_r$ and $d_s$, the beam between object sensor system 3 and phantom target 17 reflected at guard rail 14 in reflection point 18, so that it is possible to calculate a seemingly real object position. Based on the comparison of the calculated, seemingly real object position and the actually measured object location of object 16, the measurement may be utilized for a plausibilization of the measured values since the calculated, seemingly real location of phantom target 17 corresponds approximately to the location of moved object 16, and both objects have the same relative velocity $v_{rel}$ with respect to object sensor system 3. Since in the presence of phantom objects indirect object reflection beam $d_s$ may be stronger in its intensity than direct object reflection beam $d_r$, it is possible that moved object is no longer detected by object sensor system 3, and only phantom object 17 remains visible. In this case, moved object 16 located in front disappears, and object tracking may no longer be implemented with respect to this object. In the event of such a miss in object tracking, it is possible to track a previously verified real object, which was plausibilized with the aid of a phantom target 17, utilizing indirect object reflection beam $d_s$. To this end, the seemingly real object location, which is able to be calculated by phantom target location 17 as well as reflection point 18, is ascertained, and this calculated, seemingly real object location is utilized for the further object tracking. This allows continued tracking of moved object 16 by recording the indirect object reflections, until moved object 16 is once again able to be measured by direct object reflection; in this way, a method is able to be provided by which the object detection, in particular for object tracking of distance and speed controller 1, is able to be safeguarded from phantom targets.

Figure 3:
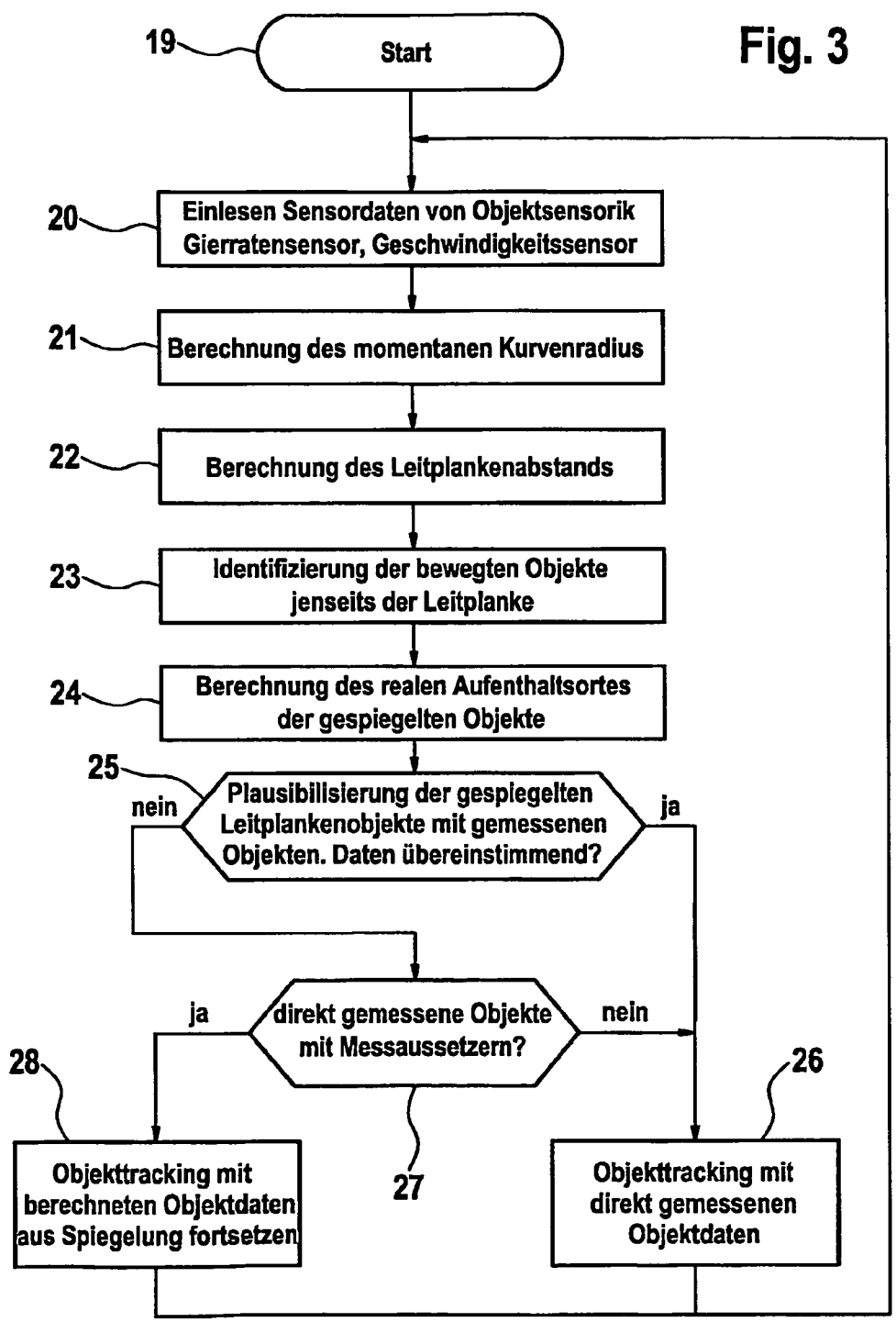
FIG. 3 shows a flow chart of a specific embodiment of the method according to the present invention.

FIG. 3 shows a flowchart of a specific embodiment of the method according to the present invention. The method begins in block 19, for instance when adaptive distance and speed controller 1 is being put into operation by driver-actuable operating element 5 or after the driver has turned on the vehicle ignition. In the further course, according to step 20, the sensor data are read into distance and speed controller 1 by object sensor system 3, yaw rate sensor 6 and velocity sensor 4. In the following step 21, the instantaneous curve radius r of the own future vehicle course 13 is calculated by analyzing yaw rate $\dot{\psi}$ of yaw rate sensor 6. After this, in following step 22, guard rail distance b is determined in that, for instance, stationary objects 15 at the side of the road are analyzed, or in that road edge 14 is estimated since no stationary objects were measured and lateral transverse distance b of the road edge is estimated. In step 23, moved objects 17, which are located beyond the guard rail, i.e., outside of the traffic lane, are identified. To this end, their locations are compared to the measured or estimated roadway edge extension 14, and it is ascertained whether object position 17 is on this side or on the other side of guard rail 14. In the following step 24, the seemingly real location is calculated for the moved objects that, in step 23, were identified as being on the other side of the guard rail in that, from the intersection of roadway edge 14 with direct straight connection lined $_s$, which connects the location position of phantom target 17 with the position of object sensor system 3, is calculated and determined as reflection point 18. Based on knowledge of reflection point 18 at guard rail 14 as well as radius of curvature 12 of roadway edge 14, which is determined from radius of curvature r of the own vehicle course and lateral transverse offset b between object sensor system 3 and roadway edge 14, the seemingly real location of the object is able to be determined. In the following step 25, a plausibilization of the indirect object reflections with the direct object reflections is implemented by checking whether phantom target position 17, which was converted into a seemingly real object location with the aid of the reflection point, coincides approximately with an actually measured, real object location 16, for which purpose the coordinates of these two points are compared; in addition, the amount of their relative velocities $v_{rel}$ must be approximately identical. If the locations of the directly measured, moved object 16 and the seemingly real object location of phantom target 17, converted with the aid of reflection point 18, match approximately, it is possible to plausibilize the directly measured real object 16, and step 25 branches to yes, so that object tracking of object 16 is able to be implemented in step 26 using the directly measured reflection data. If the values of the plausibilization in step 25 do not agree sufficiently, step 25 branches to no, and it is continued with step 27 in which it is ascertained whether object 16 measured with the aid of direct object reflection exhibits measuring misses. These measuring misses can be detected by extrapolating the object tracking of object 16 from previous measurements and checking whether the direct object reflection of moved object 16 matches the extrapolated course characteristic of the course characteristic calculated in the previous measuring cycles. If it is determined that real object 16 has no measuring misses, i.e., object positions and a relative velocity were determined for object 16 that match the previously measured values, it is branched to no in step 27, and in step 26 object tracking for object 16 is continued with the object data from the direct object reflection measurement. If it was detected in step 27 that measuring misses are present, i.e., that no object positions could be detected for object 16 since these were covered by indirect reflection, for example, step 27 branches to yes, and in step 28 object tracking is implemented using the object-position data and relative-velocity data that are converted into seemingly real object data with the aid of phantom-target position 17 and reflection point 18. This makes it possible to continue object tracking even with an object tracking miss of vehicle 16 driving ahead, for instance to regulate output-defining actuating element 10 and deceleration devices 11 of the vehicle until directly measured object values for vehicle 16 driving ahead are measured once again.

What is claimed is:

1. A method for detecting an object for a vehicle equipped with an object-detection system, the object-detection system emitting electromagnetic radiation and receiving radiation reflected off objects within the detection range, the method comprising:

analyzing directly reflected radiation that is reflected directly off a detected object, and analyzing indirectly reflected radiation that is reflected off an object extending along the roadway; and verifying the direct reflections, which were not reflected off the object extending along the roadway, based on the indirect reflections, which were reflected off the object extending along the roadway.

2. The method as recited in claim 1, wherein, if reflections from a previously directly detected object are no longer measurable, the analysis uses the indirect reflection, which was reflected off the object extending along the roadway, to detect the object.

3. The method as recited in claim 1, wherein the object extending along the roadway includes at least one of a guard rail, a tunnel wall, a boundary wall, and a noise-abatement walls.

4. The method as recited in claim 1, wherein the indirect reflection is used as a direct reflection for the analysis.

5. The method as recited in claim 4, wherein the position of the object extending along the roadway is estimated for using the indirect reflection as the direct reflection.

6. The method as recited in claim 5, wherein the measured object location, which was detected using the indirect reflection, is reflected off the object extending along the roadway.

7. The method as recited in claim 1, wherein, if reflections from a previously directly detected object are no longer measurable, the analysis uses the indirect reflection, which was reflected off the object extending along the roadway, to detect the object, wherein the object extending along the roadway includes at least one of a guard rail, a tunnel wall, a boundary wall, and a noise-abatement walls, and wherein the indirect reflection is used as a direct reflection for the analysis.

8. The method as recited in claim 7, wherein the position of the object extending along the roadway is estimated for using the indirect reflection as the direct reflection, and wherein the measured object location, which was detected using the indirect reflection, is reflected off the object extending along the roadway.

9. A device for detecting an object for a vehicle equipped with an object-detection system, the object-detection system emitting electromagnetic radiation and receiving radiation reflected off objects within the detection range, comprising:
- an analyzing arrangement to analyze directly reflected radiation that is reflected directly off a detected object, and analyzing indirectly reflected radiation that is reflected off an object extending along the roadway; and
- a verifying arrangement to verify the direct reflections, which were not reflected off the object extending along the roadway, based on the indirect reflections, which were reflected off the object extending along the roadway.

10. The device as recited in claim 9, wherein, if reflections from a previously directly detected object are no longer measurable, the analysis uses the indirect reflection, which was reflected off the object extending along the roadway, to detect the object.

11. The device as recited in claim 9, wherein the object extending along the roadway includes at least one of a guard rail, a tunnel wall, a boundary wall, and a noise-abatement walls.

12. The device as recited in claim 9, wherein the indirect reflection is used as a direct reflection for the analysis.

13. The device as recited in claim 9, wherein the position of the object extending along the roadway is estimated for using the indirect reflection as the direct reflection.

14. The device as recited in claim 9, wherein the measured object location, which was detected using the indirect reflection, is reflected off the object extending along the roadway.

15. The device as recited in claim 9, wherein, if reflections from a previously directly detected object are no longer measurable, the analysis uses the indirect reflection, which was reflected off the object extending along the roadway, to detect the object, wherein the object extending along the roadway includes at least one of a guard rail, a tunnel wall, a boundary wall, and a noise-abatement walls, and wherein the indirect reflection is used as a direct reflection for the analysis.

16. The device as recited in claim 15, wherein the position of the object extending along the roadway is estimated for using the indirect reflection as the direct reflection, and wherein the measured object location, which was detected using the indirect reflection, is reflected off the object extending along the roadway.

* * * * *